Patented Apr. 27, 1954

2,676,905

UNITED STATES PATENT OFFICE 2,676,905

STARCH SACCHARIFYING ENZYMES HIGH IN MALTASE ACTIVITY

Julian Corman and Henry M. Tsuchiya, Peoria, and Harold J. Koepsell, Peoria Heights, Ill., assignors to the United States of America as represented by the Secretary of Agriculture No Drawing. Application March 23, 1950, Serial No. 151,554

4 Claims. (Cl. 195—66)

(Granted under Title 35, U. S. Code (1952), sec. 266)

This application is made under the act of March 3, 1883, as amended by the act of April 30, 1928, and the invention herein described, if patented in any country, may be manufactured and used by or for the Government of the United States of America for governmental purposes throughout the world without the payment to us of any royalty thereon.

The invention relates to the preparation of starch saccharifying enzymes of microbial origin and is more particularly related to the preparation of new and improved fungal enzyme compositions in aerated submerged culture, which compositions are high in maltase activity and possess many technical and economic advantages over previously known fungal enzymes used for saccharifying amylaceous substances.

Maltase activity may be defined for the purposes of this specification as that property of an enzymatic preparation which renders it capable of splitting or hydrolyzing maltose to glucose. It may be measured by the ability of such a preparation to hydrolyze pure maltose monohydrate. A unit of maltase activity, for the purposes of this specification, is one which hydrolyzes one milligram of maltose monohydrate to glucose at a pH of 4.4 in one hour at 30° C.

The maltase enzyme or system of enzymes of our fungal amylase compositions, unlike yeast maltase, is capable of hydrolyzing certain of the higher polymers of glucose as well as maltose itself. This property is particularly advantageous in the practical utilization of the compositions, since it enhances their ability to convert more completely starch and starch degradation products, such as dextrins, into glucose. The compositions of our invention, being relatively high in maltase activity, have a higher relative potency therefore for saccharifying amylaceous substrates, compared with the potency of prior fungal amylase compositions. The ultimate yield of alcohol from a given amount of amylaceous material converted by our enzymes is greater, due to the increased yield of fermentable sugars. Moreover, less of our compositions are necessary for the conversion itself. Other advantages of our invention will be evident to those skilled in the art from the following specification.

This invention, therefore, has among its objects the preparation of a starch saccharifying enzyme composition high in maltase activity. A further object is the provision of a process which eliminates certain ingredients normally present in fungal enzyme submerged culture media, but found by use to be deleterious to the formation of high yields of maltase enzymes. Still another object is the provision of a process for producing new and improved fungal enzyme compositions, employing cultures of certain microorganisms discovered to be particularly advantageous.

Our invention possesses great practical significance in the production of alcohol by fermentation of carbohydrate mashes. We have found that mashes saccharified with solutions of this general type of enzyme and fermented with yeast yield alcohol in proportion to the maltase activity, provided there is also present at least one unit of alpha-amylase per milliliter of enzyme solution. Our discoveries are illustrated in Examples 1 and 2 which appear subsequently.

In general, the hydrogen ion concentration of the culture medium for submerged aerated fungal enzyme production should lie within the range of 4.0 to 7.0. Heretofore, the hydrogen ion concentration of such media has been controlled by the addition of calcium carbonate. We have found that calcium carbonate has a deleterious effect on the production of an enzyme composition high in maltase activity. We have, moreover, found that the hydrogen ion concentration may be maintained within this desired range by employing culture media in which the carbohydrate and nitrogen levels are controlled within predetermined limits. The initial pH of our media should be within the range of 4.0 to 7.0, preferably 5.0 to 5.5. If pH adjustment is necessary, an alkaline agent other than calcium carbonate should be used, as for example, sodium hydroxide. The adjustment is preferably carried out subsequent to sterilization. In media such as these the production of enzyme compositions high in maltase activity can be accomplished without sacrificing alpha-amylase activity to any detrimental degree. Our discoveries are illustrated in Example 3 which appear subsequently.

Utilizing our discoveries we have invented a process particularly directed to the production of fungal enzyme compositions from *Aspergillus niger* organisms in submerged aerated cultures. In general, the nitrogen level in our culture medium corresponds to 3 to 5 percent proteinaceous material. The carbohydrate level is increased from the customary 1 to 2 percent to a range of 3 to 10 percent. The resulting enzyme compositions obtained by inoculating these media with strains of *Aspergillus niger* are high in maltase activity and are of considerably increased starch-saccharifying potency compared with previous fungal enzymes.

As proteinaceous material we may use distillers' thin stillage, corn steep liquor, animal stick liquor and the like, but we prefer distillers' thin stillage for reasons of convenience. The carbohydrate may be corn, wheat, potatoes, or other farinaceous materials. Although the examples are cited for the use of corn, it is not our intent to limit ourselves to it as the source of carbohydrate.

Although our enzymes are of great significance in the production of alcohol, use is not limited thereto, for they may also be used in the preparation of glucose sirups.

EXAMPLE 1

Two hundred ml. aliquots of a medium consisting of 2 percent corn meal and 4 percent distillers' thin stillage were placed in duplicate liter Erlenmeyer flasks. The medium in one set of flasks was adjusted with NaOH to pH 6.5. To the other set of flasks was added 0.5 percent calcium carbonate. After sterilization and cooling to 30° C. both media were inoculated with 5 ml. of a 24-hr. culture of *A. niger* NRRL 337. The media were then placed on a reciprocating shaker for 6 days. The resulting culture filtrate obtained from the medium adjusted with NaOH assayed 8.3 maltase units per ml. and 18.2 alpha-amylase units per ml. The culture filtrate from the medium buffered with calcium carbonate assayed 4.2 maltase units per ml. and 14.0 alpha-amylase units per ml.

The above mold culture filtrates were used to saccharify 50 g. of corn meal by the following procedure. Fifty grams of corn meal and 200 ml. of tap water was placed in 500 ml. Erlenmeyer flasks and autoclaved at 25 pounds steam pressure for 30 minutes and then cooled to 70° C. The culture filtrates in the amounts tabulated below, together with sufficient water to make a total of 50 ml., were stirred into each of the corn mashes. The mashes were held at 60° C. for 10 minutes and then cooled to 30° C., at which time they were inoculated with 3 percent by volume of a 24-hr. culture of *Saccharomyces cerevisiae* NRRL Y-567 and allowed to ferment for 72 hours.

After fermentation, the entire beers were then distilled until exactly 100 ml. of each distillate was collected in a volumetric flask. Alcoholic yields were determined with a dipping refractometer and calculated to a 56-pound distillers' bushel basis. The results tabulated below indicate that grain conversion with the high maltase-containing enzyme composition proceeded more satisfactorily than that with the low maltase composition. Indeed, the former enzyme composition used at the rate of 2.2 gallons per bushel was as effective as the latter composition used at the rate of 3.6 gallons.

Table I

| Alkali used in medium for mold propagation | Culture filtrate, gals. per bushel | Alcohol yield, proof gallons per bushel |
| --- | --- | --- |
| NaOH | 2.2 | 4.98 |
| NaOH | 3.6 | 5.39 |
| CaCO₃ | 2.2 | 4.16 |
| CaCO₃ | 3.6 | 4.99 |

EXAMPLE 2

A series of fermentations similar to Example 1 were made in which 2.7 gallons of culture filtrates of *Aspergillus niger* NRRL 337 were used for saccharification of each bushel of corn mashed. In order to determine the effects of both alpha-amylase and maltase the enzyme yields in each of the culture filtrates used were controlled by culturing the organism in media of varying carbohydrate and protein concentrations. The alcohol yields obtained from grain mashes converted with enzyme compositions of various maltase potencies are summarized in the following table. The data in Table II shows correlation of alcohol yield with the maltase potencies of the enzyme compositions providing the alpha-amylase potency is at least one unit per ml.

Table II

| Enzyme potency of *A. niger* NRRL 337 Culture | | Alcohol yield, proof gallons per bushel |
| --- | --- | --- |
| Maltase units/ml. | Alpha-amylase units/ml. | |
| 1.8 | 5.1 | 3.9 |
| 3.6 | 10.2 | 4.1 |
| 5.8 | 17.5 | 5.0 |
| 7.3 | 8.9 | 5.2 |
| 8.6 | *0.1 | 4.5 |
| 9.1 | *0.8 | 4.8 |
| 10.4 | 3.3 | 5.3 |
| 10.8 | *0.8 | 5.0 |
| 11.8 | 5.5 | 5.3 |
| 12.0 | 8.6 | 5.3 |
| 18.1 | 1.5 | 5.3 |

*Alpha-amylase values are lower than 1.0 which is the minimum required.

EXAMPLE 3

A basal medium was employed consisting of 5 percent solids from distillers' thin stillage and 2 percent corn meal. Two hundred ml. lots of this basal medium were placed in liter Erlenmeyer flasks and autoclaved at 121° C. for one hour. The flasks were cooled to 30° C. and inoculated with 5 ml. of a one-day culture of *Aspergillus niger* NRRL 337. Varying amounts of calcium carbonate were added to four flasks, while one flask, to which no calcium carbonate was added, served for comparison. After six days aeration on a reciprocating shaker, the media were filtered and assayed for enzyme activity. The results are tabulated below.

Table III

| Calcium carbonate, percent | Initial pH after sterilization | Maltase units per ml. | Alpha-amylase units per ml. |
| --- | --- | --- | --- |
| (*) | 5.20 | 13.2 | 9.7 |
| 0.1 | 5.15 | 11.3 | 11.6 |
| 0.25 | 5.20 | 11.0 | 12.3 |
| 0.5 | 5.30 | 8.5 | 11.8 |
| 1.0 | 5.35 | 3.8 | 1.5 |

*NaOH used to adjust initial pH.

Alpha-amylase activity was determined by Olsen, Evans and Dickson procedure described in Cer. Chem. 24, 299 (1947).

Maltase activity was determined in a reaction mixture containing 2 volumes of 0.06 M maltose monohydrate solution buffered to pH 4.4 and 1 volume of culture filtrate. The extent of maltose hydrolysis at 30° C. was noted.

Further experimentation involving the addition of calcium carbonate sterilized separately from the rest of the fermentation media after cooling showed similar results. In each case, the maltase activity was reduced remarkably in those media employing calcium carbonate as buffer. The effect of calcium carbonate is similar when employing other Aspergillus organisms, such as *A. niger* NRRL 326, *A. niger* NRRL 330, and the like.

EXAMPLE 4

A series of culture media were made up containing varying concentrations of corn meal as carbohydrate and distillers' thin stillage as nitrogen source. The hydrogen ion concentrations were adjusted to pH 5.2 with NaOH solution subsequent to sterilization. The media comprised 200 ml. lots contained in liter flasks which were sterilized, and then cooled to 30° C. The flasks were subsequently inoculated with 5 ml. of a 24-hr. liquid culture of *A. niger* NRRL 337. The flasks were placed on a reciprocating shaker for 6 days after which the culture filtrates assayed as follows.

*Table IV*

EFFECT OF MEDIUM COMPOSITION ON YIELDS OF MALTASE

| Corn meal, percent | Distillers' thin stillage solids, percent | | | |
|---|---|---|---|---|
| | 1 | 3 | 5 | 7 |
| | Maltase units produced per ml. | | | |
| 2 | 3.1 | 11.0 | 14.4 | 15.3 |
| 5 | 6.9 | 14.4 | 18.4 | 14.9 |
| 7 | 11.3 | 11.7 | 12.2 | 15.4 |
| 10 | 12.3 | 13.5 | 13.9 | 13.0 |

*Table V*

EFFECT OF MEDIUM COMPOSITION ON YIELDS OF ALPHA-AMYLASE

| Corn meal, percent | Distillers' thin stillage solids, percent | | | |
|---|---|---|---|---|
| | 1 | 3 | 5 | 7 |
| | Alpha-amylase units produced per ml. | | | |
| 2 | 0.08 | 0.5 | 3.4 | 12.3 |
| 5 | 0.1 | 0.9 | 9.1 | 14.8 |
| 7 | 0.5 | 2.4 | 16.8 | 14.5 |
| 10 | 0.7 | 12.8 | 16.2 | 12.6 |

Tables IV and V illustrate the variance in maltase and alpha-amylase yields caused by variation in the medium composition. Our enzyme compositions possess satisfactory converting properties for use in distillery operations at levels of one alpha-amylase unit per ml. and above. In accordance with our invention the maltase value can be increased to high levels by increasing the amount of carbohydrate, as well as by increasing the concentration of distillers' stillage solids up to 5 percent, as shown in Table V.

The effect of our invention extends generally to the various strains of *A. niger* organisms as illustrated in the following example.

EXAMPLE 5

In this example media similar to those employed in the previous example were inoculated with various strains of *A. niger*. Each strain was cultured in sets of media employing varying amounts of carbohydrate. The results are summarized below.

*Table VI*

[Maltase units per ml.]

| Organism | Corn meal, percent | |
|---|---|---|
| | 2 | 5 |
| | Maltase units produced per ml. | |
| *A. niger* NRRL 337 | 7.4 | 12.7 |
| *A. niger* NRRL 330 | 18.9 | 29.9 |
| *A. niger* NRRL 326 | 18.2 | 25.1 |

We claim:
1. Method for producing a fungal enzyme composition high in maltase activity which comprises cultivating *Aspergillus niger* organisms in a submerged aerated culture medium, said culture medium being free of added calcium carbonate, the pH being controlled within the range 4.0 to 7.0, the initial pH being in the range 5.0 to 5.5, the medium containing proteinaceous and carbohydrate nutrient material.
2. The process of claim 1 in which the nitrogen content of the proteinaceous medium corresponds to 3 to 5 percent proteinaceous material.
3. The process of claim 2 in which the culture medium comprises 3 to 10 percent carbohydrate nutrient.
4. The process of claim 3 in which the pH is initially adjusted with NaOH in the range 4.0 to 7.0, the hydrogen ion concentration being maintained during the cultivation by controlling the carbohydrate and nitrogen levels within the recited limits, and recovering a culture filtrate containing said enzyme compoistion.

References Cited in the file of this patent

UNITED STATES PATENTS

| Number | Name | Date |
|---|---|---|
| 2,102,315 | Grassmann et al. | Dec. 14, 1937 |
| 2,291,009 | Underkofler | July 28, 1942 |
| 2,451,567 | Mense et al. | Oct. 19, 1948 |

OTHER REFERENCES

Chemical Abstracts, 1949, column 3490 Vyatkin et al. (U. S. S. R. Patent No. 68,325 of April 30, 1947).